United States Patent [19]

Zabrocki et al.

[11] Patent Number: 4,547,533
[45] Date of Patent: Oct. 15, 1985

[54] GLASS-FIBER-REINFORCED ABS-MOLDING COMPOSITIONS

[75] Inventors: Karl Zabrocki, Buettgen; Christoph Tiburtius, Cologne; Joachim Döring, Cologne; Klaus Richter, Cologne, all of Fed. Rep. of Germany

[73] Assignee: Bayer Aktiengesellschaft, Leverkusen-Bayerwerk, Fed. Rep. of Germany

[21] Appl. No.: 625,036

[22] Filed: Jun. 27, 1984

[30] Foreign Application Priority Data

Jul. 9, 1983 [DE] Fed. Rep. of Germany ....... 3324909

[51] Int. Cl.$^4$ .......................... C08K 7/14; C08K 9/04; C08L 55/02; C03C 25/02
[52] U.S. Cl. .................................. 523/206; 524/495; 524/504
[58] Field of Search ......................................... 523/206

[56] References Cited

U.S. PATENT DOCUMENTS 3,619,229 11/1971 Hartlein .................................. 117/4
3,763,088 10/1973 Izawa et al. .......................... 523/440
3,844,821 10/1974 Lanik .................................... 524/488
4,410,645 10/1983 Das et al. ............................. 523/206

FOREIGN PATENT DOCUMENTS 1250117 9/1967 Fed. Rep. of Germany.
0090049 6/1982 Japan .................................... 523/206
1086980 of 0000 United Kingdom.

Primary Examiner—Herbert J. Lilling
Attorney, Agent, or Firm—Connolly and Hutz

[57] ABSTRACT

Glass-fiber-reinforced ABS-molding compositions comprising
 (a) from 60 to 98% by weight of an ABS-plastic;
 (b) from 2 to 40% by weight of sized glass fiber; and
 (c) from 0 to 5% by weight of one or more additives,
the glass fiber being treated with a size which contains a polymer containing epoxide groups and a copolymer of, on the one hand, styrene, nuclear-methylated styrene, α-methyl styrene, methylmethacrylate or a mixture thereof and, on the other hand, acrylonitrile.

9 Claims, No Drawings

GLASS-FIBER-REINFORCED ABS-MOLDING COMPOSITIONS

It is known that ABS-plastics can be reinforced with glass fibers. Tensile strength, modulus of rupture and dimensional thermal stability are improved in this way. Unfortunately, discoloration during processing and surface roughness of the finished article are unavoidable. The reason for these faults is probably the poor coupling between glass fibers and ABS-plastics. A thin film of water is formed on the hydrophilic surface of the glass fibers and adheres firmly thereto through hydration preventing chemical and physical bonding between the glass surface and the organic polymeric material.

In order to obtain better coupling, the glass fibers have been sized, preferably during forming at the fiber-drawing stage, i.e. provided with a coating compatible with the polymer and improving the adhesion properties of the glass fibers, and strands, yarns, rovings or cloths produced from coated fibers. The size may be applied to the glass fibers by spraying or immersion immediately after they have been formed. The size has to be applied in the form of an aqueous solution or dispersion. Solutions in organic solvents cannot be used because the spinning bushings are very hot so that there is a serious risk of fire.

Sizing also improves the processiblity of the glass fibers at all processing stages. The filaments, threads or strands are protected against friction and other mechanical stressing by lubrication and coating.

The size generally contains:
1. Film-forming agents or adhesives;
2. lubricants or slip agents;
3. adhesion promoters;
4. auxiliaries (for example emulsifiers and antistatic agents); and
5. water.

In general, up to 2% by weight of solids (based on glass fibers) are applied to the glass fibers.

The chemical composition of the binder is crucial to the compatibility of the polymer with the glass fiber and to the mechanical properties of the molding composition consisting of the glass fiber and the organic polymer.

Film-forming agents and adhesives which have been use include polyvinyl acetate, polyurethanes, formaldehyde, resins, polyesters, polyacrylates, epoxy resins (DE-PS No. 2,943,128) or mixtures thereof (U.S. Pat. Nos. 3,755,009 and 3,844,821). It is preferred to use film-forming agents which are compatible with the polymers to be reinforced, for example polypropylene for glass fibers which are incorporated in polyolefins (DE-OS No. 23 60 698). It is known from DE-OS No. 28 16 463 that ABS-plastics can be reinforced with glass fibers which have been treated with an aqueous emulsion of a styrene/acrylonitrile resin. In that case, however, the resin has to be used in quantities of from 5 to 30% by weight, based on glass, so that processing is seriously complicated.

The present invention provides glass-fiber-reinforced ABS-molding compositions of:
(a) from 60 to 98% by weight of an ABS-plastic;
(b) from 2 to 40% by weight of sized glass fiber; and
(c) from 0 to 5% by weight of one or more additives, characterised in that the glass fiber is treated with a size which contains a polymer containing epoxy groups and a copolymer of styrene, nuclear-methylated styrene, α-methyl styrene, methyl methacrylate or a mixture thereof on the one hand and acrylonitrile on the other hand.

In the context of the invention, ABS-plastics are preferably products obtained by the graft polymerization of resin-forming monomers onto rubbers and also mixtures of such graft products with resins formed from the graft monomers. A mixture of monomers containing, on the one hand, styrene, α-methyl styrene, a $C_1$–$C_4$-(meth)acrylate, maleic acid anhydride or an N-alkyl or N-aryl derivative of maleic imide or a mixture thereof and, on the other hand, acrylonitrile or methacrylonitrile is generally grafted. A mixture of styrene and acrylonitrile is preferred. The resins optionally added are also produced from these monomers. In general, they correspond in their composition to the polymers grafted on. It is also possible to use the resins alone and to omit the graft polymers completely.

It is particularly preferred to use a mixture of from 40 to 100% by weight of a styrene/acrylonitrile copolymer having a molecular weight of $>10^5$ and from 0 to 60% by weight of a graft rubber obtained by grafting styrene and acrylonitrile onto a rubber. The rubber is generally polybutadiene or a butadiene/styrene copolymer.

Products of this type are known and are described, for example, in DE-PS Nos. 2,420,357 and 2,420,358; in DE-OS Nos. 18 13 719 and 18 04 763 and in U.S. Pat. Nos. 3,509,238 and 3,928,494. Products distinguished by high dimensional stability under heat are described, for example in E-PS No. 41 703 and U.S. Pat. Nos. 4,298,716 and 4,273,895. Other thermoplasts, for example acrylic resins, polycarbonates, polyesters, polyamide and polyvinylchloride, may also be added to the ABS-plastics.

The known types of glass used for the production of glass filament, such as E-, A-, C- and S-glass, and also the known glass staple fiber products are suitable for producing the glass fibers sized in accordance with the present invention. Among the types of glass mentioned for the production of endless glass fibers, E-glass fibers are the most important for reinforcing plastics because, in contrast to A- and C-glass, E-glass is substantially alkali-free, which accounts for its favorable electrical insulating properties and its greater resistance to water and alkalis. E-glass fibers are also superior to A-glass fibers in their tensile strength and modulus of elasticity.

The sizes required for producing the sized glass fibers according to the present invention are aqueous dispersions of film-forming agents, adhesion promoters, lubricants and auxiliaries, such as wetting agents or antistatic agents. They are produced in known manner, cf. K. L. Loewenstein: The Manufacturing Technology of Continuous Glass Fibers, Elsevier Scientific Publishing Corp., Amsterdam/London/New York (1973). The sizes are applied in known manner, i.e. by means of suitable apparatus, such as spray or roller systems, to the glass filaments drawn at high speed from bushings immediately after they have solidified, i.e. before winding up. However, the fibers may also be sized in an immersion bath after the spinning process.

The sized, moist glass fibers are then dried at temperatures in the range from 90° to 160° C. and subsequently processed into rovings or staple or milled fibers. In this connection, drying is understood to be not just the removal of water and other volatile constituents, but also the solidification of the size constituents, particularly the film-forming agent. It is only on completion of drying that the size changes into a solid coating composition.

The quantity of size applied amounts to ≦2% (based on sized fiber).

Typical size formulations consist of:
(a) from 0.6 to 12% by weight (expressed as solids) of one or more film-forming agents;
(b) from 0.05 to 0.15% by weight (expressed as solids) of one or more adhesion promoters;
(c) from 0.05 to 1.5% by weight (expressed as solids) of one or more lubricants;
(d) from 0.0 to 1.0% by weight (expressed as solids) of auxiliaries;
(e) add 100% by weight of water.

According to the invention, the film-forming component used is a system of one or more polymers which contain epoxy groups and also a copolymer of styrene and acrylonitrile, the styrene being completely or partly replaceable by nuclear-methylated styrenes, α-methyl styrene and/or methylmethacrylate. Such copolymers are preferably produced by aqueous emulsion copolymerization of the above-mentioned monomers. Polymers having molecular weight of from $10^4$ to $10^6$ are preferably from $10^5$ to $5 \times 10^5$ are suitable.

Styrene/acrylonitrile copolymers and α-methyl styrene/acrylonitrile copolymers in which the weight ratio of the monomers is from 65–80 to 35–20 are particularly suitable.

Standard epoxy resin and epoxy polyester systems of the type already known as film-forming constituents for glass fiber sizes may be used for introducing the epoxy groups. Such systems are described for example, in DE-OS Nos. 14 96 630, 16 69 584, 31 40 947 and 26 06 284, in U.S. Pat. No. 3,983,056 in DE-OS No. 20 37 523 and in U.S. Pat. Nos. 4,029,620, 2,943,128 and 2,934,951. Expoxy systems based on bisphenol-A-bis-glycidol ether and its higher homologs are preferred.

The quantitative ratios between the two polymers may vary within wide limits:
copolymer: from 2 to 95% by weight (based on film-former solids)
epoxy resin: from 98 to 5% by weight (based on film-former solids).

Where the copolymer has a high molecular weight ($M < 3 \times 10^5$), less abrasion will be encountered during processing of the glass fiber if the epoxy resin content is less than 40%.

Preferred quantitative ratios are:
copolymer: from 40 to 60% (based on film-former solids),
epoxy resin from 60 to 40% (based on film-former solids).

It is also possible to provide the copolymer itself with epoxy groups and to add only part, if any, of the epoxy resin. One suitable way of doing this is to carry out copolymerization with comonomers containing epoxy groups, for example glycidol esters of unsaturated carboxylic acids, such as acrylic acid, methacrylic acid, maleic/fumaric acid and itaconic acid. The quantities of the epoxy comonomer in the monomer mixture to be reacted amount to between 1 and 25% by weight and preferably to between 3 and 15% by weight (based on the monomer mixture). Epoxy groups can also be introduced by polymer-homolog reaction, for example by the epoxidation of lateral copolymerized allyl groups, although this is not preferred.

The film former system may be additionally provided with other standard film formers, for example polyvinylacetate, polybutadiene, polyurethanes and polyesters. These film formers are preferably used to optimize the processing behaviour of the fibers. Their solids content should amount to no more than 50% by weight and preferably to no more than 10% by weight of the solids content of the total film former.

The quantitative ratios between epoxy-containing and epoxy-free polymer in the film former may be additionally determined through the concentration of epoxy oxygen which may also be established by analysis.

Mixtures of terpolymers containing from 7 to 350 mMoles of [0]/100 g of film former solids have proved to be favorable in this connection. The range from 20 to 70 mMoles is preferred for pure terpolymers whereas mixtures with epoxy resins are particularly favourable in the range from 7 to 350 mMoles of [0]/100 g of film former solids.

Glass fibers distinguished by favourable processibility, abrasion resistance, substantial freedom from fluff and a strong reinforcing effect are obtained with the sizes according to the invention, particularly those in the preferred range.

Conventional silane adhesion promoters are used as adhesion promoters either individually or in combination with one another.

The concentration of the silane adhesion promoter (for example vinyl trimethoxy silane, vinyl triethoxy silane, vinyl-tris(β-methoxyethoxy)-silane, γ-methacryloxypropyl trimethoxy silane, γ-methacryloxypropyl-tris-(β-methoxyethoxy)-silane, γ-glycidoloxypropyl trimethoxy silane, β-(3,4-epoxycyclohexyl)-ethyl trimethoxy silane and the known aminosilanes and urea silanes) in the sizes according to the invention amounts to between 0.05 and 1.5% by weight and preferably to between 0.15 and 0.85% by weight, based on the total size. Concentrations in excess of 1.5% by weight are, on the one hand, undesirable on account of the formation of relatively thick silicone layers on the glass fibers, which are known to weaken rather than to improve the bond between the glass fibers and the plastic to be reinforced and, on the other hand, also uneconomical because the silanes are difficult to obtain on a commercial scale and, accordingly, are expensive. In concentrations below 0.05% by weight, the silane adhesion promoter is generally not effective enough. Concentrations of from 0.05 to 0.15% by weight are selected when the size is applied to the glass fibers not during the spinning process, i.e. in fractions of a second, but for example by impregnation of the glass fibers in a size bath, which for practical reasons takes a much longer time during which far greater utilization of the size is possible than is the case where the size is applied during the spinning process.

A particularly firm bond between the ABS-polymer and the glass fibers is provided by combinations of a urea silane and an epoxy silane, both being used in substantially equal parts by weight.

The sizes according to the invention contain nonionic and/or cationic lubricants which may consist, for example, of the following groups of substances: polyalkylene glycol ethers of fatty alcohols or fatty amines, polyalkylene glycol esters and glycerol esters of $C_{12}$–$C_{18}$-fatty acids, polyalkenyl glycols, higher $C_{12}$–$C_{18}$ fatty acid amides of polyalkylene glycols and/or alkenylamines, quaternary nitrogen compounds, for example ethoxylated imidazolinium salts, mineral oils and waxes.

The lubricant is advantageously used on its own or in combination with other lubricants in a total concentration of from 0.05 to 1.5% by weight, based on the total size.

In addition, the sizes may contain standard auxiliaries, such as emulsifiers, colloid auxiliaries, wetting agents, co-solvents and antistatic agents, for example lithium chloride, ammonium chloride, Cr-(III) salts, organic titanium compounds, aryl alkyl sulfates or sulfonates, aryl polyglycol ether sulfonates or quaternary nitrogen compounds. If they are used on their own or in combination with one another, their concentrations amount to between 0.01 to 1.0% by weight.

Additives which are necessary to aid and assist production, working up, further processing and removal from molds, for example oxidation inhibitors, UV-stabilizers, peroxide destroyers, antistatic agents, lubricants, flameproofing agents, fillers and dyes, may be added to the molding compositions according to the invention in the usual way.

The molding compositions according to the invention may be prepared by mixing the components in the quantities indicated in standard units for processing plastics such as roll stands, mixing extruders or internal kneaders. One particular embodiment is characterized by the use of a mixing extruder into which the glass fibers are directly drawn from the roving in the form of endless fibers and are incorporated in that form. In this case, the fibers remain longer, which is reflected in improved mechanical properties of the molding.

The plastics according to the invention may be processes in standard processing units, for example by injection molding and sheet extrusion, optionally followed by hot forming, tube and profile extrusion and calendering.

The glass fibers sized in accordance with the invention may readily be incorporated in the thermoplast melt, a firm bond being established between them and the thermoplast matrix.

EXAMPLES

Production of the sized glass fibers

The following starting materials were used:

| | |
|---|---|
| A | A copolymer latex of 69 parts of α-methyl-styrene + 31 parts of acrylonitrile. |
| B | A copolymer latex of 72 parts of styrene + 28 parts of acrylonitrile. |
| C | A copolymer latex of 68.4 parts of styrene + 26.6 parts of acrylonitrile + 5.0 parts of glycidyl methylacrylate. |
| D | An aliphatic polyester-polyurethane dispersion |
| E | An epoxy resin-diane dispersion. |
| F | A urea-functional silane (A 1160). |
| G | An epoxy-functional silane (A 187) |
| H | A fatty acid amide (Persoftal FN, a product of BAYER AG) as lubricant. |

The size mixtures were produced in known manner (S. Loewenstein, loc. cit.) by adding the silanes, film formers and lubricants to the aqueous solution in that order. The final pH-value was adjusted to between 6.0 and 8.5.

The quantities for A to H indicated in Table 1 are g of solids per 100 g of total size.

The sizes were applied by immersion to glass fiber strand 11μ and 14μ in diameter and dried at 110°–160° C. The amount of size applied in % by weight, i.e. g of dried size per 100 g of glass fiber, was then measured (Table 1).

The sized glass fibers were then converted in known manner into short glass strands having fiber length of 6 mm.

Production and testing of the ABS moldings 3085 parts of an α-methyl-styrene-based ABS powder containing 11.5% of polybutadiene, which had been produced by mixing 77.5 parts of an α-methyl styrene/acrylonitrile (ratio by weight 69:31) copolymer with 22.5 parts of a graft polymer, the graft polymer having been produced by polymerizing 11.5 parts of a styrene-acrylonitrile mixture (ratio by weight 72:28) in the presence of 11.5 parts (expressed as solids) of a polybutadiene latex, were mixed in a kneader with 617 g of the sized short glass fibers, granulated and subsequently injection-molded at a melt temperature of 240° C. to form test plates measuring approximately 75×155×2 mm.

The size materials and molding were judged on the basis of the following criteria:
the processibility of the sized glass fibers assessed qualitatively on the basis of their abrasion-resistance and fluff-formation during processing;
colorimetric determination of the injection moldings in accordance with DIN 6174; the color standard used was a test specimen produced under the same conditions using a standard commercially available glass fiber intended for ABS-materials (Product 414×17 of Owens Corning);
determination of the undulation depth of the test specimens as an average of 3 measurements in accordance with DIN 4768 and of the maximum undulation depth, again as an average of 3 measurements, in accordance with DIN 4762/1 (Draft) and ISO/DIS 4287/1 (Draft).

The formulations and test results obtained are summarized in Table 1 from which the superiority of the system according to the invention is clearly apparent.

TABLE 1

Examples and Comparison Tests

| Example Comparison tests | g solids per 100 g of size | | | | | | | Amount of size applied % by weight | processibility | Colorimetric determination in accordance with Cielab | | Measurement of the undulation depth in accordance with DIN | |
|---|---|---|---|---|---|---|---|---|---|---|---|---|---|
| | A | B | C | D | E | F | G | H | | | DL | DE | maximum $R_t$ | average $R_Z$ |
| CT (a) | 3.0 | — | — | 3.0 | — | 0.3 | 0.3 | 0.25 | 0.86 | good | −1.6 | 2.9 | 14.3 | 6.9 |
| (b) | 4.0 | — | — | 4.0 | — | 0.3 | 0.3 | 0.25 | 1.05 | good | −3.0 | 4.9 | 11.2 | 7.1 |
| (c) | — | — | — | — | 4.2 | 0.21 | 0.21 | 0.17 | 0.58 | good | −0.5 | 1.3 | 11.2 | 6.2 |
| (d) | — | 4.0 | — | — | — | 0.3 | 0.3 | 0.25 | cannot be measured | not possible; serious abrasion | | | | |
| (e) | 4.0 | — | — | — | — | 0.3 | 0.3 | 0.25 | | | | | | |
| Ex. 1 | — | — | 7.5 | — | — | 0.3 | 0.3 | 0.25 | 0.80 | good | +2.4 | 3.3 | 7.5 | 4.5 |
| Ex. 2 | — | — | 2.1 | — | 2.1 | 0.21 | 0.21 | 0.17 | 0.65 | good | +0.4 | 1.1 | 8.9 | 5.7 |

TABLE 1-continued

| | Examples and Comparison Tests | | | | | | | | | | | | | |
|---|---|---|---|---|---|---|---|---|---|---|---|---|---|---|
| Example Comparison tests | g solids per 100 g of size | | | | | | | | Amount of size applied % by weight | processibility | Colorimetric determination in accordance with Cielab | | Measurement of the undulation depth in accordance with DIN | |
| | A | B | C | D | E | F | G | H | | | DL | DE | maximum $R_f$ | average $R_Z$ |
| Ex. 3 | 3.0 | — | — | — | 3.0 | 0.3 | 0.3 | 0.25 | 0.74 | good | +0.5 | 1.2 | 8.8 | 5.5 |
| Ex. 4 | 2.1 | — | — | — | 2.1 | 0.21 | 0.21 | 0.17 | 0.61 | good | +0.6 | 1.0 | 8.3 | 5.5 |

We claim:

1. A glass-fiber-reinforced ABS-molding composition comprising:
   (a) from 60 to 98% by weight of an ABS-plastic;
   (b) from 2 to 40% by weight of sized glass fibers; and
   (c) from 0 to 5% by weight of one or more additives, wherein the glass fiber is treated with a size comprising a polymer containing epoxy groups and a copolymer of (i) acrylonitrile and (ii) styrene, nuclear-methylated, α-methyl styrene, methyl methacrylate or a mixture thereof.

2. A molding composition as claimed in claim 1, wherein the size comprises from 2 to 95% by weight of styrene/acrylonitrile or a α-methyl styrene/acrylonitrile resin and from 98 to 5% by weight of epoxy resin.

3. A moulding composition as claimed in claim 1, wherein the glass fibers are E-glass fibers.

4. A moulding composition as claimed in claim 2, wherein the glass fibers are E-glass fibers.

5. A molding composition as claimed in claim 1, wherein the ABS-plastic comprises from 40 to 100% by weight of a styrene/acrylonitrile copolymer having a molecular weight of $>10^5$ and from 0 to 60% by weight of a graft rubber obtained by grafting styrene and acrylonitrile onto a rubber.

6. A molding composition as claimed in claim 2, wherein the ABS-plastic comprises from 40 to 100% by weight of a styrene/acrylonitrile copolymer having a molecular weight of $>10^5$ and from 0 to 60% by weight of a graft rubber obtained by grafting styrene and acrylonitrile onto a rubber.

7. A molding composition as claimed in claim 3, wherein the ABS-plastic comprises from 40 to 100% by weight of a styrene/acrylonitrile copolymer having a molecular weight of $>10^5$ and from 0 to 60% by weight of a graft rubber obtained by grafting styrene and acrylonitrile onto a rubber.

8. A molding composition as claimed in claim 3, wherein the ABS-plastic comprises from 40 to 100% by weight of a styrene/acrylonitrile copolymer having a molecular weight of $>10^5$ and from 0 to 60% by weight of a graft rubber obtained by grafting styrene and acrylonitrile onto a rubber.

9. A molding composition as claimed in claim 4, wherein the ABS-plastic comprises from 40 to 100% by weight of a styrene/acrylonitrile copolymer having a molecular weight of $>10^5$ and from 0 to 60% by weight of a graft rubber obtained by grafting styrene and acrylonitrile onto a rubber.

* * * * *